United States Patent [19]
Griffin

[11] Patent Number: 5,860,272
[45] Date of Patent: Jan. 19, 1999

[54] MOWER BELT HOUSING HOLE COVER

[76] Inventor: Ronald H. Griffin, 22640 E. 76th St., Broken Arrow, Okla. 74014

[21] Appl. No.: 938,587

[22] Filed: Sep. 26, 1997

[51] Int. Cl.[6] .................................................. A01D 34/82
[52] U.S. Cl. ................................ 56/320.1; 56/1; 56/17.4; 56/DIG. 20; 56/DIG. 24; 285/46
[58] Field of Search ............................. 56/320.1, 320.2, 56/17.4, 1, DIG. 20, DIG. 24; 285/46

[56] References Cited

U.S. PATENT DOCUMENTS

| | | |
|---|---|---|
| 4,407,023 | 10/1983 | Norton .................................. 285/46 X |
| 4,490,954 | 1/1985 | Cresti .................................... 285/46 X |
| 4,630,431 | 12/1986 | Schlueter et al. . |
| 4,887,420 | 12/1989 | Cerny, Jr. et al. .................. 56/320.1 X |
| 5,461,848 | 10/1995 | Anthony . |

FOREIGN PATENT DOCUMENTS 40-6094165  4/1994  Japan ....................................... 285/46
1 422 846  1/1976  United Kingdom ..................... 285/46

*Primary Examiner*—Terry Lee Melius
*Attorney, Agent, or Firm*—Akard & Griffin

[57] ABSTRACT

A hole cover for covering and sealing the main pulley hole of a lawn and garden tractor mower belt housing. The cover includes a central hole adapted to receive the main pulley therein. A radial opening of the hole cover provides a passageway through which the main pulley may pass when the hole cover is placed around the main pulley. A fastener is used to secure the hole cover to the belt housing. The belt housing includes a bellows surrounding the central hole that provides better sealing and an adjustable central hole size making the hole cover universally acceptable to a wide variety of main pulley sizes. The radial opening defines facing sides of the hole cover that overlap one another to better provide sealing of the main pulley hole. An alternative interlocking mechanism attaches the facing sides to one another.

18 Claims, 3 Drawing Sheets

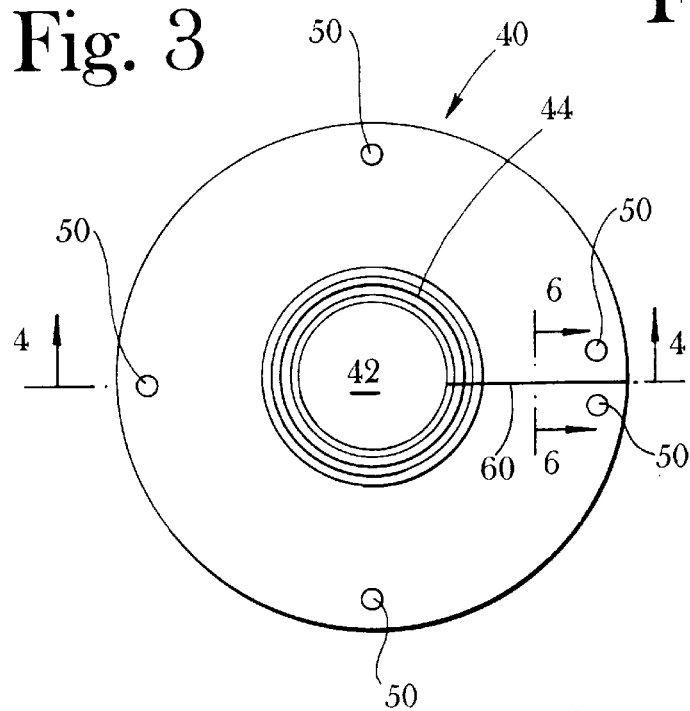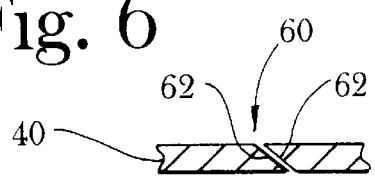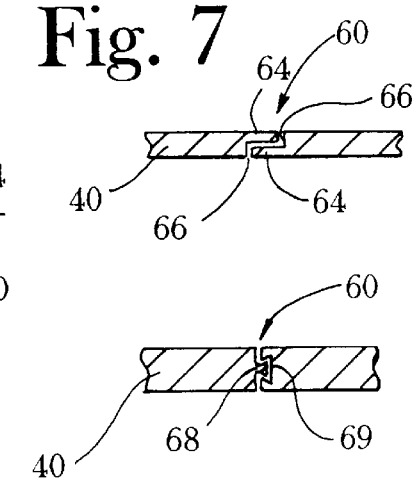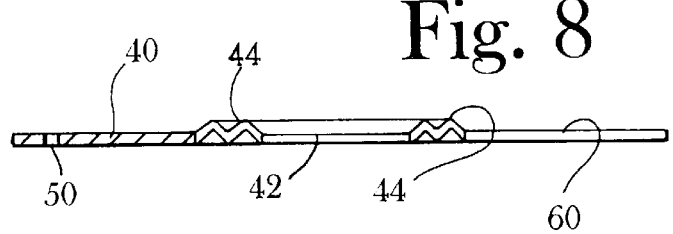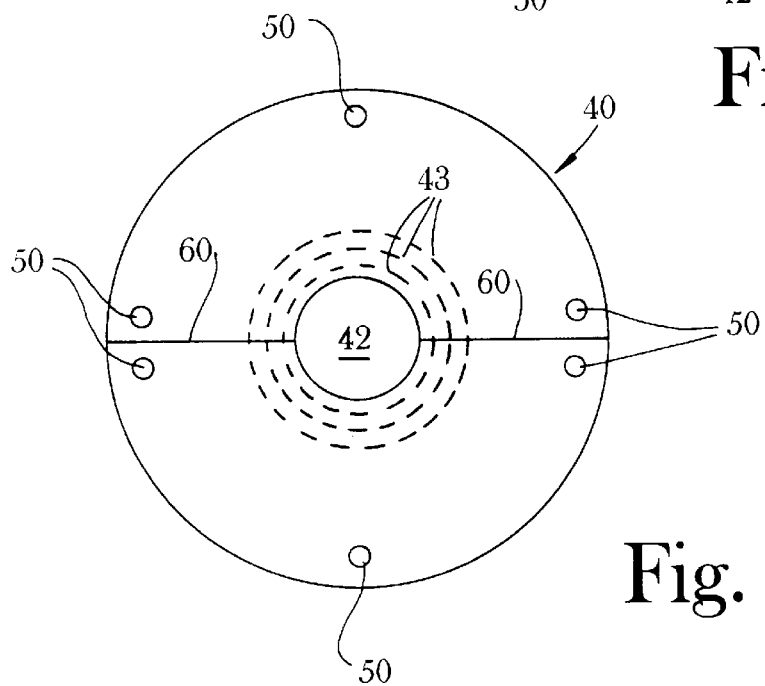

MOWER BELT HOUSING HOLE COVER

BACKGROUND OF THE INVENTION

1. Field of Invention

The present invention relates to the field of machine covers and more specifically to a mower belt housing hole cover that prevents debris and moisture from entering the belt housing and causing deterioration of the belts and other components housed therein.

Lawn and garden tractor mowers, typically utilize belts to transmit the rotational motion of the motor into the required rotational motion of the cutting blades. This is particularly true for larger lawn and garden tractor mowers that use a plurality of offset rotating blades to effect the cutting over a relatively wide area. In many of these tractor mowers, the belts are housed in a belt housing designed to protect the belts from the elements and to enclose the rotating and moving parts for safety purposes. A shaft for each of the rotating blades extends through a relatively small hole in the floor of the belt housing and is attached to a pulley associated with each of the blades and housed within the belt housing. The pulleys are interconnected by the pulley drive belt. One of the pulleys, the main pulley, extends upward through a relatively large main pulley hole in the top of the housing where it is attached to a main drive belt of the tractor mower that transmits the power from the tractor engine motor to the main pulley. This system of drive belts and pulleys transmits the engine power of the tractor mower to the individual blades creating the necessary blade motion.

One problem associated with this system is that, during operation of the mower, the cut grass, dirt, and moisture enters the main pulley hole and deposits on the belt and the pulley components. Typically, after only a few weeks of operation the dirt, moisture, and grass that has entered the housing causes sufficient deterioration to the belts that they must be replaced. Accordingly, frequent replacement of the belts is required. When the belts break, the mower is unusable and changing the belts is relatively expensive. Likewise, the debris entering the housing causes accelerated deterioration of the pulley bearings, the other pulley components, and the housing itself. Damage to these components may require expensive repairs to the mower. Thus, a cover adapted to fit over the hole in the belt housing is needed to prevent the debris and moisture from entering the belt housing and causing deterioration of the belts, pulleys, and other components housed therein.

2. Related Art

As discussed in U.S. Pat. No. 5,461,848 that issued to Anthony on Oct. 31, 1995, which is hereby incorporated herein by reference, the use of machine covers is known in the prior art. However, while the prior art references are useful for their intended purposes, none of the prior art references disclosed therein show a mower belt housing hole cover for a lawn and garden tractor mower that is adapted for simple, retrofit application to the tractor mower and provides for sealing of the housing to prevent debris and moisture from entering the housing during operation.

SUMMARY OF THE INVENTION

Accordingly, the objectives of the present invention are to provide, inter alia, a mower belt housing hole cover that:
prevents debris from entering the belt housing of a lawn and garden tractor mower;
covers the main pulley hole of a belt housing of a lawn and garden tractor mower helping to seal the interior of the belt housing;
deters deterioration of the belts and other components, such as the pulleys and their bearings, housed within the belt housing;
extends the life of the belts and pulleys of the lawn and garden tractor mower;
is adaptable to any mower that has a belt housing encasing the drive pulleys and a main pulley hole therein;
lowers the maintenance costs associated with the lawn and garden tractor mower;
may be easily retrofitted onto existing lawn and garden tractor mowers; and
is low in cost and simple to install and implement.

Other objects of the invention will become apparent from time to time throughout the specification and claims as hereinafter related.

To achieve such improvements, the present invention provides a mower belt housing hole cover for sealing the main pulley hole of a lawn and garden tractor mower belt housing to prevent debris, such as cut grass and dirt, and moisture from entering the belt housing during operation of the tractor mower. Thereby, the hole cover helps to slow deterioration of the drive belt and the other mower components enclosed within the belt housing, including the belt housing itself. The hole cover is designed so that it may be easily adapted to any mower having a belt housing with a main pulley hole.

In one aspect, the present invention provides an apparatus for covering a main pulley hole of a belt housing of a lawn and garden tractor mower and for sealing the area of the main pulley hole between the belt housing and a main pulley. A hole cover defines a central hole therethrough and a radial opening. The radial opening extends from the central hole to a periphery of the hole cover and defines a pair of facing sides. The radial opening has an open position wherein the main pulley may pass therethrough and a closed position wherein the facing sides abut one another. Preferably the facing sides overlap one another. In one embodiment of overlapping facing sides, the radial opening is a diagonal cut through the hole cover. An alternative embodiment of the overlapping facing sides uses sides that have an extended portion and a recessed portion. The extended portions are positioned and adapted to overlap one another when the radial opening is in the closed position. The facing sides may also incorporate an interlocking mechanism that is adapted to attach the facing sides to one another when the radial opening is in the closed position. In the interlocking mechanism, one of the facing sides includes a detent and the other facing side includes a detent receiver, or groove. The detent has an outer portion that is larger than an inner portion of the detent and the detent receiver is adapted to receive and maintain the detent therein.

In another aspect of the invention, the hole cover provides a means for adjusting the size of the central hole making the hole cover more adaptable to a wide variety of mowers. The preferred means incorporates a bellows surrounding the central hole. An alternative means uses a plurality of perforations in the hole cover that are concentric with the central hole.

A further aspect of the invention provides a means for fastening the hole cover to the belt housing. The means for fastening may be any type of fastener such as screws, bolts, clips, or any other fastener that allows for easy removal of the hole cover.

The hole cover is preferably adapted for use on a lawn and garden tractor mower sold by CRAFTSMAN and for a lawn and garden tractor mower having a plurality of cutting blades that have a pulley cover and a central drive hole.

BRIEF DESCRIPTION OF THE DRAWINGS

The manner in which these objectives and other desirable characteristics can be obtained is explained in the following description and attached drawings in which:

FIG. 3 is a top elevational view of the hole cover.

FIG. 4 is a sectional view of the hole cover taken along lines 4—4 in FIG. 3.

FIG. 5 is a top elevational view of an alternative embodiment for the hole cover.

FIG. 6 is a partial, sectional view of the hole cover taken along lines 6—6 in FIG. 3 showing one possible overlapping design of the facing sides of the radial opening.

FIG. 7 is a partial, sectional view of the hole cover taken along lines 6—6 in FIG. 3 showing another possible overlapping design of the facing sides of the radial opening.

FIG. 8 is a partial, sectional view of the hole cover taken along lines 6—6 in FIG. 3 showing a third possible overlapping design of the facing sides of the radial opening that also includes an interlocking mechanism.

Figure 1:
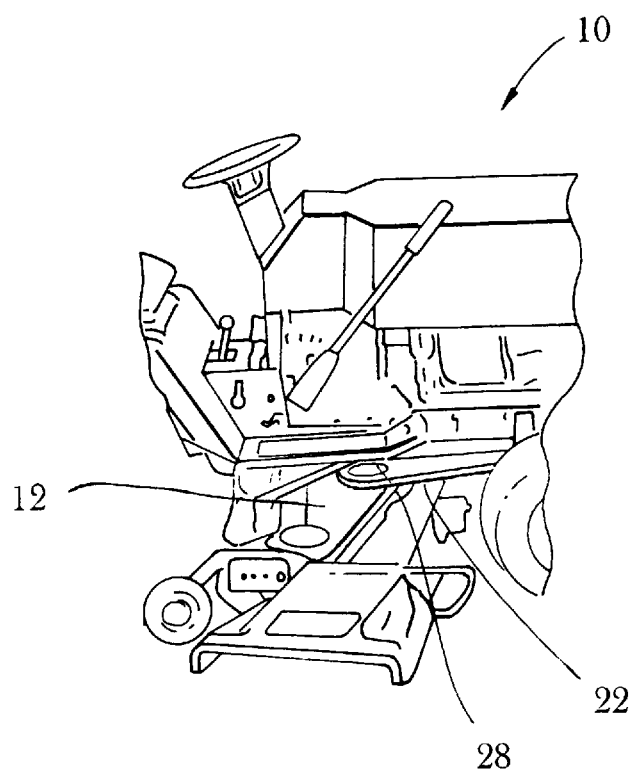
FIG. 1 is a partial isometric view of the lawn and garden tractor mower.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention generally provides a mower belt housing hole cover 40 for sealing the main pulley hole 16 of a lawn and garden tractor mower belt housing 12 to prevent debris, such as cut grass and dirt, and moisture from entering the belt housing 12 during operation of the tractor mower 10. Thereby, the belt housing hole cover 40 helps to slow deterioration of the drive belt and the other mower components enclosed within the belt housing, including the belt housing 12 itself.

As used herein, lawn and garden tractor mower 10 refers to any mower or tractor that includes a belt housing 12 having a main pulley hole 16 therein. The terms mower and lawn and garden tractor mower 10 as used herein are interchangeable. The hole cover 40 is particularly configured and adapted for use with a lawn and garden tractor mower 10 manufactured and sold by "CRAFTSMAN" such as the one sold under model number 917.2559101. Many CRAFTSMAN mowers have similar designs that incorporate the belt housing 12 having a main pulley hole 16 therein. Thus, the present invention may be used with any of the similar models. However, it is to be understood that the present invention may also be used with any other lawn and garden tractor mower 10 having the main pulley hole 16 whether manufactured and sold by CRAFTSMAN, by JOHN DEERE, or by any other company.

Figure 2:
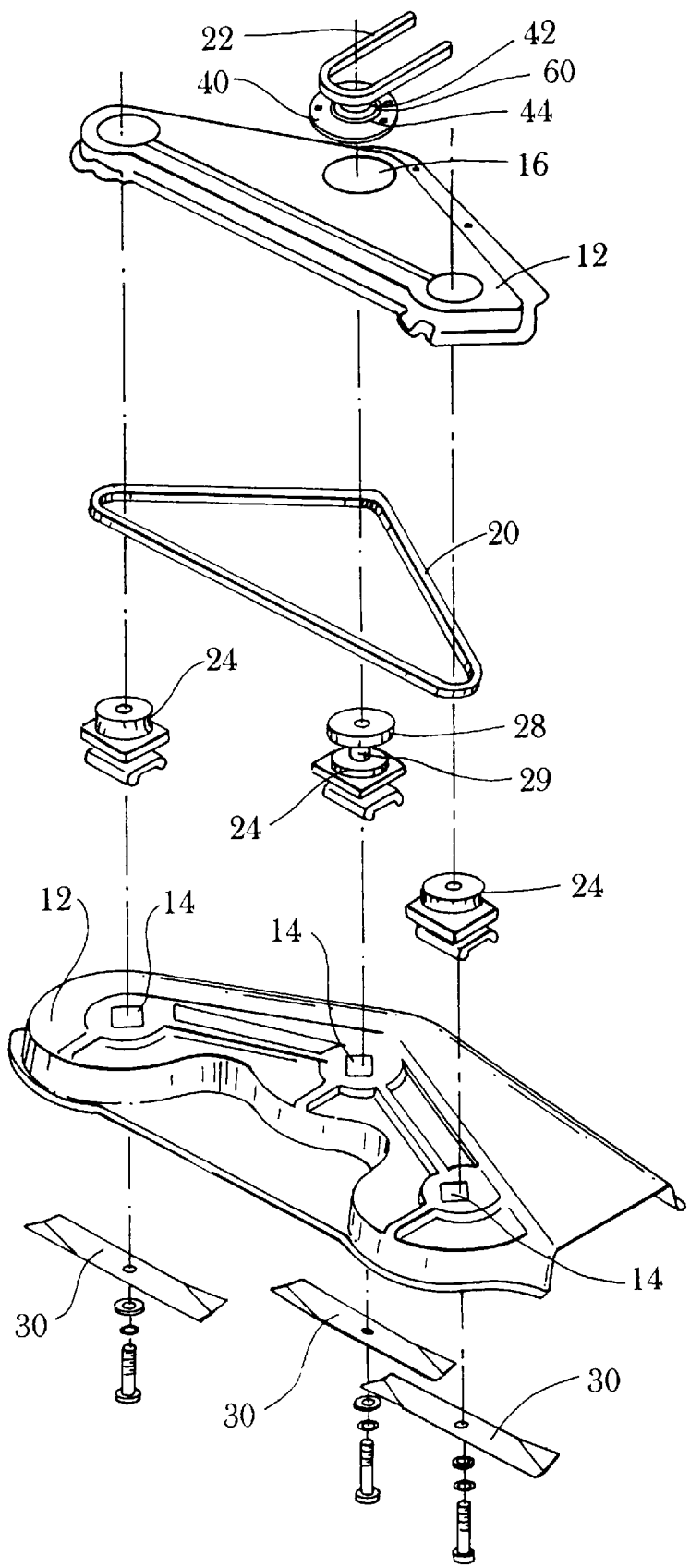
FIG. 2 is a partial exploded perspective view of the belt housing showing the pulleys, belts, and cutting blades.

FIG. 1 is a perspective view of a lawn and garden tractor mower 10 having a plurality of offset cutting blades 30 each rotatable about an axis of rotation. The following description discusses a lawn and garden tractor mower 10 having a plurality of cutting blades 30. FIG. 2 shows an exploded view of the belt housing 12, the pulley 24, the pulley drive belt 20, and the cutting blades 30. The axes of rotation of the cutting blades 30 are parallel to and offset from one another.

In general, the lawn and garden tractor mower 10 uses a system of belts and pulleys 24 to transmit power from the engine to the cutting blades 30 to create the necessary rotating blade motion. Therefore, a pulley 24 is attached to each of the cutting blades 30 and is disposed coaxially with and vertically above the associated cutting blade 30 so that rotation of the pulley 24 causes rotation of the associated cutting blade 30 about its axis. The pulleys 24 are interconnected to one another by a pulley drive belt 20. The lawn and garden tractor mower 10 also includes a tensioning, or idler, pulley (not shown) interconnected to the pulley drive belt 20 to maintain the belt tension and provide some flexibility therefor. The pulleys 24 and the pulley drive belt 20 are enclosed within a belt housing 12. The belt housing 12 is a substantially rigid structure of the lawn and garden tractor mower 10 that defines an interior cavity and is adapted to protect the belts and pulleys 24 from the elements and to act as a safety device to prevent a user from contacting the moving parts contained therein. Additionally, the housing provides a support structure for the pulleys 24 and the cutting blades 30. The shafts that connect the pulleys 24 to the associated cutting blades 30 extend through small blade shaft holes 14 in the bottom of the housing. One of the pulleys 24, hereinafter referred to as the "main pulley" 28, extends upward through a main pulley hole 16 defined in the top of the belt housing 12. A main drive belt 22 of the lawn and garden tractor mower 10 is connected to the main pulley 28 at a position above and exterior to the belt housing 12. The main drive belt 22 is also interconnected to the lawn and garden tractor engine and provides for transmission of power from the engine to the main pulley 28.

Accordingly, in operation the engine drives the main drive belt 22 which turns the main pulley 28. The main pulley 28 then turns the pulley drive belt 20 positioned below the main drive belt 22 within the belt housing 12. The pulley drive belt 20 transmits the power from the main pulley 28 to the other pulleys 24 within the belt housing 12. Each of the pulleys 24 then rotates a cutting blade 30 attached thereto.

The hole cover 40 is adapted to be attached to the belt housing 12 and placed over the main pulley hole 16 so as to more completely enclose the interior of the belt housing 12 and the belts and pulleys 24 contained therein and to prevent debris and moisture from entering the interior of the belt housing 12. By preventing debris from entering the belt housing 12, the hole cover 40 deters deterioration of the belts and other lawn and garden tractor mower components.

FIGS. 3 and 4 are a top elevational and side cross sectional views respectively of the hole cover 40. The hole cover 40 is preferably circular having an outer diameter that is larger than the diameter of the the shaft 29 connecting the pulleys of the main pulley hole 16 and defines a central axial hole therethrough having a diameter that is greater than or equal to the diameter of the main pulley 28. As used herein, the term "main pulley" shall be used to refer generally to the main pulley 28 as well as its component parts (i.e. its pulleys and shaft 29). Additionally, the hole cover 40 is relatively thin (for example, about ³⁄₁₆ to ⅛ inches), lightweight and flexible. Although the hole cover 40 may be made of virtually any somewhat flexible, durable material, the hole cover 40 is preferably made of plastic or a metal, such as aluminum.

Preferably, the area of the hole cover 40 surrounding the central hole 42 includes a bellows 44, or accordion, that is a pleated and expansible flexible part that expands and contracts as necessary to alter the diameter of the central hole 42. Therefore, the hole cover 40 may be positioned about a variety of main pulleys 28 which have different diameters and may be used with a variety of lawn and garden tractor mowers 10. The use of the bellows 44 promotes a more universal design for the hole cover 40 and its use with a wider variety of lawn and garden tractor mowers 10. Additionally, the bellows 44 ensures that the fit of the hole cover 40 around the main pulley 28 is correct in all instances further enhancing the seal of the hole cover 40 with the main pulley 28 and better preventing debris from entering the belt housing 12. Further, the bellows 44 facilitates installation of the hole cover 40 making installation simpler and faster. Because the bellows 44 allows the central hole 42 of the hole cover 40 to move and adjust as required by the relative position of the main pulley 28, the alignment of the hole cover 40 with the main pulley 28 during installation is less crucial. If the hole cover 40 is slightly misaligned with respect to the main pulley 28, the bellows 44 will simply expand and contract as necessary to center the central hole 42 with the main pulley 28 and provide the required seal therebetween. Thus, in the case of the misaligned hole cover 40, the central hole 42 is not necessarily coaxial with the hole cover 40.

Although the hole cover 40 preferably includes the bellows 44, the bellows 44 may be omitted. The hole cover 40 may comprise a flat, plate-like structure having a central hole 42 therethrough. The central hole 42 could be adapted to the size of the main pulley 28 in a variety of ways such as by simply cutting the central hole 42 to the required size during installation. The hole cover 40 could be provided with a plurality of perforations 43, each defining a different size central hole 42 so that, during installation of the hole cover 40 on the mower, the material around the central hole 42 could simply be pressed out at the perforation 43 having the diameter nearest that of the outer diameter of the main pulley 28 (see FIG. 5). Together, the design using the bellows 44, the design wherein the central hole 42 is simply cut out during installation of the hole cover 40, and the design including the perforations 43 defining different central hole 42 diameters represent means for varying the central hole diameter and/or position.

To facilitate placement of the hole cover 40 on the main pulley 28 without substantial dismantling of the main pulley 28, the hole cover 40 includes a radial opening 60, or slit, that extends from the central hole 42 to the outer edge of the hole cover 40. Thus, the annular-shaped hole cover 40 is not continuous, but includes a break that allows the hole cover 40 to be opened so that the hole cover 40 may be slid around the shaft 29 of the main pulley 28. Thus, the radial opening 60 provides a passageway through which the main pulley 28 may pass as the hole cover 40 is placed around the main pulley 28. Due to the thin design and semi-flexible material of the hole cover 40, the radial opening 60 may simply be a linear cut in the hole cover 40 extending from the outer edge to the central hole 42. Because the hole cover 40 is flexible, the hole cover 40 can be bent to open the radial opening 60 enough to allow the hole cover 40 to be placed around the main pulley 28 (particularly the shaft 29). The flexible hole cover 40 will then return to its original position, due to its natural resiliency, so that its flat upper surface lies substantially in a single plane. Therefore, the radial opening 60 preferably has an open position wherein it is sized to allow the hole cover 40 to be placed about the main pulley 28 and a closed position wherein the sides of the radial opening 60, the slit, abut one another to provide a complete seal around the full periphery of the main pulley 28 and the hole cover 40. Of course, the hole cover 40 could, in the alternative, be made from two separate pieces which are then placed around the main pulley hole (See FIG. 5).

To enhance the sealing of the radial opening 60, the facing sides 62 of the radial opening 60 preferably overlap one another. By overlapping the facing sides 62, the "overlapping surfaces," the hole cover 40 is better able to seal the main pulley hole 16 because debris and moisture contacting the hole cover 40 perpendicular thereto is not able to pass through the radial opening 60, but is instead deflected. Also slight separation of the facing surfaces of the radial opening 60 will not cause a substantial opening through the hole cover 40 because the facing sides 62 overlap. FIGS. 6 through 8 show cross sectional side views of three possible overlapping designs. FIG. 6 shows an overlapping design in which the radial opening 60 is a diagonal cut in the hole cover 40. The diagonal cut provides a natural overlapping surfaces and is simple to incorporate into the hole cover 40. FIG. 7 shows an alternative design in which the facing sides 62 have an extended portion 64 and a recessed portion 66. The extended portion 64 of each of the facing sides 62 is positioned to mate with the recessed portion 66 of the other facing side 62 so that the extended portion 64 of one facing side 62 overlaps the extended portion 64 of the other facing side 62.

The alternative design shown in FIG. 8 shows the use of an interlocking, overlapping design. The interlocking feature disclosed in FIG. 8 helps ensure that the facing sides 62 are overlapping at all times and helps to ensure sealing of the main pulley hole 16 about the full periphery of the main pulley 28. In the alternative design, one of the facing sides 62 includes a detent 68 extending therefrom. The outer portion of the detent 68 is slightly larger than the inner portion of the detent 68. The other facing side 62 has a mating detent receiver 69, or groove, extending the full length of the side. The detent receiver 69 is adapted to receive and interlock with the detent 68. Thus, the outer lip of the detent receiver 69 is slightly narrower than the back end of the detent receiver 69. Further, the outer lip of the detent receiver 69 is slightly smaller than the outer portion of the detent 68 so that the detent 68 may be snapped into the detent receiver 69 and maintained therein. Of course many alternative embodiments for overlapping and interlocking facing sides 62 are possible and are considered part of the scope of the present invention.

To facilitate mounting of the hole cover 40 to the top of the belt housing 12 to cover the main pulley hole 16, the present invention preferably includes means for fastening the hole cover 40 to the belt housing 12. However, an alternative design is to simply position the hole cover 40 about the main pulley 28 without attaching it to the belt housing 12 and allow it to rest on the top of the belt housing 12. With such a design, the hole cover 40 would be free to rotate, possibly reducing wear of the hole cover 40. However, omitting attachment of the hole cover 40 may cause it to lift from the top of the belt housing 12 and allow debris to pass underneath the hole cover 40. If this alternative design is used, it is preferred that the facing sides 62 of the radial opening 60 include an interlocking mechanism to prevent the radial opening 60 from inadvertently moving to the open position during operation of the lawn and garden tractor mower 10 which may allow debris into the belt housing 12 or may throw the hole cover 40 from around the main pulley 28.

However as mentioned, the preferred embodiment does incorporate a means for fastening the hole cover 40 to the belt housing 12. The means may be any standard type of fastener including screws, bolts, clips, or any other fastener that allows for easy removal of the hole cover. The preferred embodiment disclosed in the figures, particularly FIG. 3, discloses a hole cover 40 defining five attachment holes 50 extending therethrough. The attachment holes 50 are spaced about the periphery of the hole cover 40. One attachment hole 50 is positioned proximal each of the facing sides 62 on each side of the radial opening 60 to help maintain the radial opening 60 in the closed position once the hole cover 40 has been installed around the main pulley 28. Matching holes may then be provided, such as by drilling, in the belt housing 12 and a screw placed therein.

Installation of the hole cover 40 is therefore very simple. The radial opening 60 is placed in the open position and the hole cover 40 is positioned around the shaft 29 of the main pulley 28. The radial opening 60 is returned to the close position so that the facing sides 62 overlap. The hole cover 40 is then fastened to the belt housing 12. Once installed, the hole cover 40 prevents debris from entering the main pulley hole 16 of the belt housing 12. By keeping the debris from the belts and pulleys 24 in the belt housing 12, the belts and pulleys 24 last longer and the lawn and garden tractor mower 10 requires less maintenance and is therefore less expensive to operate.

While the foregoing is directed to the preferred embodiment of the present invention, other and further embodiments of the invention may be devised without departing from the basic scope thereof, and the scope thereof is determined by the claims which follow.

I claim:

1. An apparatus for covering a main pulley hole of a belt housing of a lawn and garden tractor mower and for sealing the area of the main pulley hole between the belt housing and a main pulley, the main pulley and the belt housing defining an area therebetween sufficiently large for debris to pass therethrough, the apparatus comprising:

a hole cover defining a central hole therethrough and a radial opening;

the radial opening extending from the central hole to a periphery of the hole cover and defining a pair of facing sides; and the radial opening having an open position wherein the main pulley may pass therethrough and a closed position wherein the facing sides abut one another.

2. The apparatus of claim 1 wherein the pair of facing sides overlap one another.

3. The apparatus of claim 2 wherein the radial opening comprises a diagonal cut through the hole cover.

4. The apparatus of claim 2 wherein:

each of the pair of facing sides includes an extended portion and a recessed portion; and the extended and recessed portions of the pair of facing sides positioned and adapted so that the extended portions overlap one another when the radial opening is in the closed position.

5. The apparatus of claim 2 further comprising an interlocking mechanism adapted to attach the pair of facing sides to one another.

6. The apparatus of claim 5 wherein:

one of the pair of facing sides having a detent extending therefrom;

the other of the pair of facing sides having a detent receiver therein;

the detent having an outer portion that is larger than an inner portion of the detent; and the detent receiver adapted to receive and maintain the detent therein.

7. The apparatus of claim 1 further comprising means for adjusting the size of the central hole.

8. The apparatus of claim 7 wherein the means for adjusting the size of the central hole comprises a bellows surrounding the central hole.

9. The apparatus of claim 7 wherein the means for adjusting the size of the central hole comprises:

a plurality of perforations in the hole cover; and the plurality of perforations concentric with the central hole.

10. The apparatus of claim 1 further comprising means for fastening the hole cover to the belt housing.

11. An apparatus for covering a main pulley hole of a belt housing of a lawn and garden tractor mower and for sealing the area of the main pulley hole between the belt housing and a main pulley, the main pulley and the belt housing defining an area therebetween sufficiently large for debris to pass therethrough, the apparatus comprising:

a hole cover defining a central hole therethrough and a radial opening; and means for adjusting the size of the central hole.

12. The apparatus of claim 11 wherein the means for adjusting the size of the central hole comprises a bellows surrounding the central hole.

13. The apparatus of claim 11 wherein the means for adjusting the size of the central hole comprises:

a plurality of perforations in the hole cover; and the plurality of perforations concentric with the central hole.

14. An apparatus for sealing a main pulley hole of a belt housing comprising:

a hole cover defining a central hole therethrough and a radial opening;

the hole cover adapted for retroactive attachment to a lawn and garden tractor mower;

the hole cover having an outer diameter that is greater than the diameter of a main pulley hole of a belt housing of the lawn and garden tractor mower;

means for adjusting the size of the central hole so that the central hole diameter may be adjusted to a diameter that is equal to or greater than the outer diameter of the main pulley shaft;

the main pulley hole having a diameter sufficiently larger than the main pulley shaft that substantial debris may pass therebetween;

the radial opening extending from the central hole to a periphery of the hole cover and defining a pair of facing sides; and the radial opening having an open position wherein the main pulley may pass therethrough and a closed position wherein the facing sides abut one another.

15. The apparatus of claim 14 wherein the hole cover is adapted for use on a lawn and garden tractor mower having a plurality of cutting blades.

16. The apparatus of claim 14 wherein the means for adjusting the size of the central hole is a bellows surrounding the central hole.

17. The apparatus of claim 14 wherein the pair of facing sides overlap one another.

18. The apparatus of claim 14 further comprising an interlocking mechanism adapted to attach the pair of facing sides to one another.

* * * * *